United States Patent
Synal

(10) Patent No.: US 11,206,528 B1
(45) Date of Patent: Dec. 21, 2021

(54) COMMUNICATION CLIENT MANAGER

(71) Applicant: T-Mobile USA, Inc., Bellevue, WA (US)

(72) Inventor: Adrian T. Synal, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/905,439

(22) Filed: Jun. 18, 2020

(51) Int. Cl.
*H04W 8/24* (2009.01)
*H04W 8/26* (2009.01)
*H04W 8/18* (2009.01)
*H04W 8/20* (2009.01)
*H04L 29/12* (2006.01)
*H04L 29/06* (2006.01)

(52) U.S. Cl.
CPC ......... *H04W 8/183* (2013.01); *H04L 61/6054* (2013.01); *H04L 65/1006* (2013.01); *H04W 8/20* (2013.01); *H04W 8/24* (2013.01)

(58) Field of Classification Search
None
See application file for complete search history.

(56) References Cited

U.S. PATENT DOCUMENTS

| | | | |
|---|---|---|---|
| 2018/0198830 A1* | 7/2018 | Wallis | H04L 65/1006 |
| 2020/0296578 A1* | 9/2020 | Synal | H04W 8/28 |
| 2020/0314632 A1* | 10/2020 | Fallah | H04L 65/1016 |

* cited by examiner

*Primary Examiner* — Gary Lafontant
(74) *Attorney, Agent, or Firm* — Lee & Hayes, P.C.

(57) ABSTRACT

Techniques for designating non-native communication clients as the primary client for user equipment are discussed herein. A primary client can be the communication client designated to receive incoming communications for the user equipment. The user equipment may use the primary client to send, to a network device, a Session Initiation Protocol (SIP) instance to set primary client. The SIP instance may include a primary designator and a Universally Unique Identifier (UUID) associated with the client. The network device may store the information for the user equipment including the UUID and capability set. A second user equipment may poll the network device for the communications capabilities of the first user equipment before establishing a connection.

20 Claims, 5 Drawing Sheets

500 ↘

```
┌─────────────────────────────────────────────────────────────────┐
│ RECEIVE, FROM A USER EQUIPMENT, FIRST SESSION INITIATION        │
│ PROTOCOL (SIP) INFORMATION INCLUDING A MOBILE STATION            │
│ INTERNATIONAL SUBSCRIBER DIRECTORY NUMBER (MSISDN) AND AN       │
│ INTERNATIONAL MOBILE EQUIPMENT IDENTITY (IMEI) OF THE USER      │
│ EQUIPMENT                                                        │
│ 502                                                              │
└─────────────────────────────────────────────────────────────────┘
                                 ↓
┌─────────────────────────────────────────────────────────────────┐
│ DETERMINE, BASED AT LEAST IN PART ON THE IMEI, A NATIVE CLIENT   │
│ OF THE USER EQUIPMENT IS ASSOCIATED WITH THE IMEI                │
│ 504                                                              │
└─────────────────────────────────────────────────────────────────┘
                                 ↓
┌─────────────────────────────────────────────────────────────────┐
│ RECEIVE, FROM THE USER EQUIPMENT, SECOND SIP INFORMATION         │
│ INCLUDING THE MSISDN, A PRIMARY DESIGNATOR, AND A UNIVERSALLY    │
│ UNIQUE IDENTIFIER (UUID);                                        │
│ 506                                                              │
└─────────────────────────────────────────────────────────────────┘
                                 ↓
┌─────────────────────────────────────────────────────────────────┐
│ DETERMINE, BASED AT LEAST IN PART ON THE PRIMARY DESIGNATOR, A   │
│ PRIMARY CLIENT OF THE USER EQUIPMENT IS ASSOCIATED WITH THE UUID │
│ 508                                                              │
└─────────────────────────────────────────────────────────────────┘
                                 ↓
┌─────────────────────────────────────────────────────────────────┐
│ DETERMINE A USER ACCOUNT ASSOCIATED WITH THE MSISDN INCLUDES    │
│ THE NATIVE CLIENT ASSOCIATED WITH THE IMEI AND THE PRIMARY      │
│ CLIENT ASSOCIATED WITH THE UUID                                  │
│ 510                                                              │
└─────────────────────────────────────────────────────────────────┘
                                 ↓
┌─────────────────────────────────────────────────────────────────┐
│ RECEIVE, FROM A SECOND USER EQUIPMENT, A SUBSCRIBE REQUEST FOR  │
│ THE USER ACCOUNT ASSOCIATED WITH THE MSISDN                     │
│ 512                                                              │
└─────────────────────────────────────────────────────────────────┘
                                 ↓
┌─────────────────────────────────────────────────────────────────┐
│ TRANSMIT, TO THE SECOND USER EQUIPMENT AND BASED AT LEAST IN    │
│ PART ON THE SUBSCRIBE REQUEST, A NOTIFICATION WITH A CAPABILITY │
│ SET ASSOCIATED WITH COMMUNICATIONS CAPABILITIES OF THE PRIMARY  │
│ CLIENT                                                           │
│ 514                                                              │
└─────────────────────────────────────────────────────────────────┘
```

FIG. 5

COMMUNICATION CLIENT MANAGER

BACKGROUND

Modern telecommunication systems include heterogeneous mixtures of second, third, fourth, and fifth generation (2G, 3G, 4G, 5G) cellular wireless access technologies, which may be cross-compatible and may operate collectively to provide communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies.

To take advantage of the multigenerational mix of wireless communication technologies, user devices configured for telecommunications are capable of communicating, not only via various types of networks but also via various types of communication clients developed for the different networks. Current user devices are released with some of these secondary communication clients along with the standard native communication clients. Additionally, more options are available with third-party client applications. With the ever-growing list of popular communication applications, a user may prefer to use a third-party client over the native client as the primary communication interface. However, merely setting the third-party client as the primary client for the device may not be enough to take full advantage of the capabilities of the third-party client.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 illustrates an example process for receiving client information from a first user equipment and notifying a second user equipment of the client information, as discussed herein.

DETAILED DESCRIPTION

Figure 1:
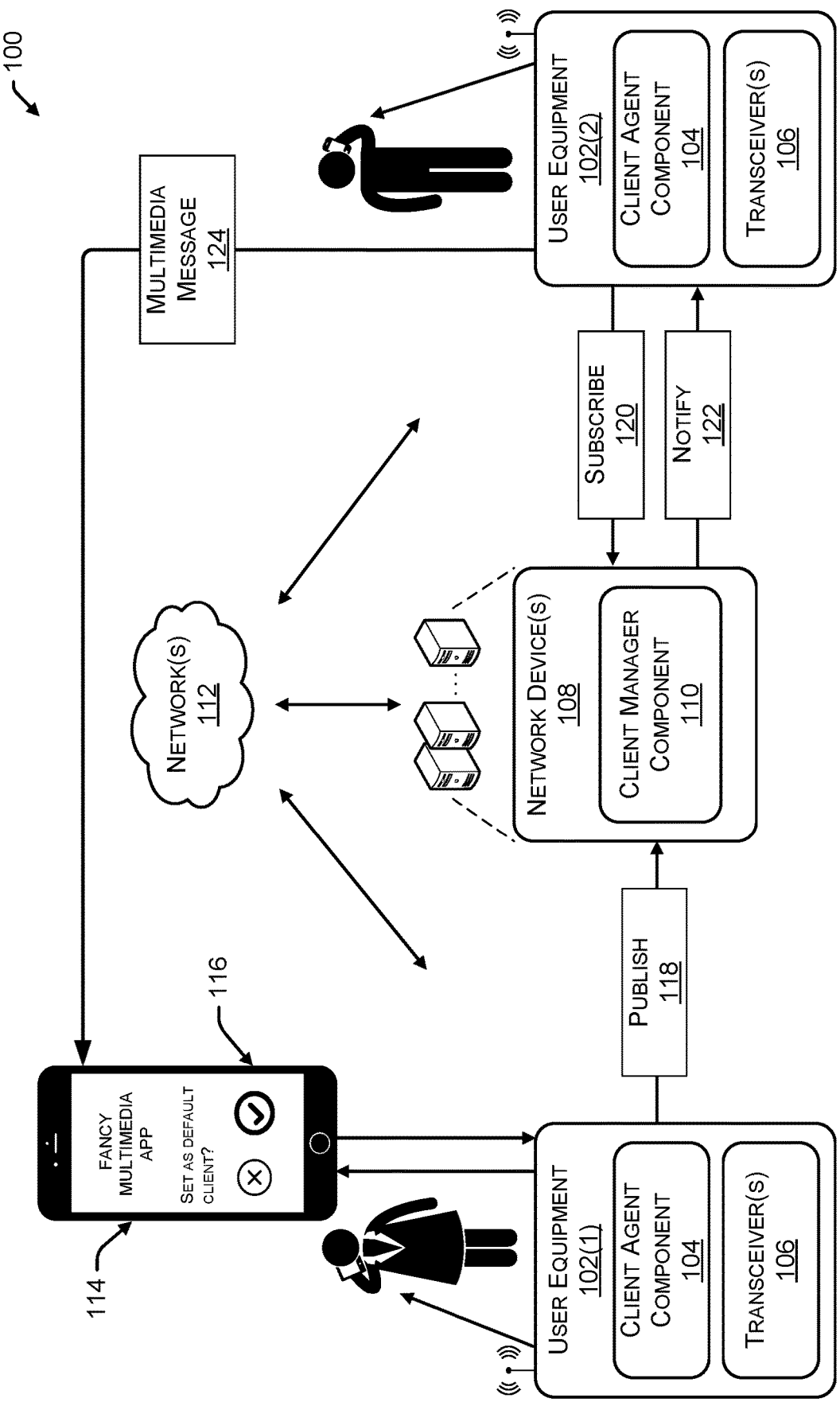
FIG. 1 illustrates an example system including user equipment and network device configured to implement client managing components to identify the primary client.

Systems, devices, and methods are directed to user devices and network devices configured to implement client managing components to identify the primary client and to provide notifications of the capabilities of the primary client. The present system may allow a user device to set a preferred client to receive incoming calls and text messages rather than use the default native client. Additionally, the system may allow the user device to communicate this preferred client and communications capabilities to the network so that other user devices may communicate by using these communications capabilities (e.g. video conference).

Initially, a user may create a user account to subscribe to a telecommunications service with a service provider's network ("the network"). The user account may initiate a user device, via a native communication client ("native client") of the user device, to use the network. During the initiation, the network may automatically designate the native client as a primary communication client ("primary client") for the user device. A primary client may be considered to be the communication client designated to receive incoming communications for the device. As used herein, non-primary communication clients may be referred to as secondary clients. The user device may include and/or the user may download non-native communication clients ("non-native clients"). The non-native clients may include functional capabilities that are different from the native client. For instance, a native client may send Short Message Service (SMS) messages while a non-native client may send Rich Communication Services (RCS) messages.

In various examples, a user associated with a user account may designate a non-native client as the primary client. The network may facilitate communications between various user devices ("user device" or "user equipment"). Designating a non-native client to be the primary client may be difficult for the network to recognize. Typically, the network assumes a communication client using an International Mobile Equipment Identity (IMEI) based Session Initiation Protocol (SIP) instance is the primary client, which may not be the case because the user may wish to designate a non-native client. However, the non-native client may not have permission to access the IMEI identifier assigned the user device.

In examples, the network may provide the client agent component for the user devices to share user data including the designated primary client. A network device, operating as part of the service provider's network, can implement a client manager component to receive and store the user data including communication client information to facilitate communications routing. The client agent component may allow a user to change the current primary client to a different user-selected client and may publish the change to the network. If the client agent component determines that the user-selected client does not have access to the IMEI, the client agent component may identify the client by its associated Universally Unique Identifier (UUID). The client agent component may send SIP information including a primary designator and the UUID to the network device. If a network device receives SIP information from a user device that includes the primary designator, the network device can determine the UUID identifies the primary client for the user device.

In various examples, the network device may receive and share capability information associated with the primary client. As described herein, the network device can store information received for a user account, by its associated Mobile Station International Subscriber Directory Number (MSISDN), International Mobile Subscriber Identity (IMSI), and further store information regarding the primary client for the user account. The network device can store the UUID for the primary client to direct communication logic to the correct client. In additional examples, the network device can store communications capabilities as a capability set for the primary client. The network device may handle subscribe requests from a second device that is polling the server to determine the capability set for the first device. The network device may notify the second device of the primary client and the capability set of the primary client. Thus, the second device may apply the capability set when communicating with the first device In some instances, the systems, devices, and techniques described herein allow for a client managing system to identify primary clients and notifying client capabilities by and between devices in the system. The system allows a user device to designate a non-native client as the primary client and notifies other devices of the capabilities of the primary client. This optimizes network bandwidth use and improves communication logic because communication data can incorporate the capability set of the primary client to change the type of communication that client is capable of supporting rather than blindly limit all communications based on a presumed default capability set. For instance, a first device may designate a multimedia capable non-native client as the primary client, a second device may poll the servers for the capability set of the first device before initiating communications, and the second device may transmit large animated emoticons or high-resolution videos in accordance to the capability set, etc. Additionally, by allowing the second device to poll for the capabilities of the primary client before transmitting data, the data can be also be scaled down accordingly before transmission which reduces network bandwidth usage. For instance, if the first device moved into a low-quality network area, the primary client may be downgraded to a native texting client, and the second device polling and receiving the capability set of the current primary client may refrain from transmitting high-resolution multimedia files. These and other improvements to the functioning of a computer and network are discussed herein.

The systems, devices, and techniques described herein can be implemented in a number of ways. Example implementations are provided below with reference to the following figures.

FIG. 1 illustrates an example system 100 including user equipment and network device configured to implement client managing components to identify the primary client.

In some instances, user equipment 102(1) and user equipment 102(2) (collectively referred to as user equipment 102) can include a client agent component 104 and one or more transceiver(s) 106. The user equipment 102 can communicate with one or more network device(s) 108 via one or more network(s) 112. As described herein, a user may create a user account with a service provider to subscribe to service for the user equipment 102. The user equipment 102 may be associated with an identifier for the device and/or a user account, including a Mobile Station International Subscriber Directory Number (MSISDN), an International Mobile Subscriber Identity (IMSI), an International Mobile Equipment Identity (IMEI), user identification, and user profile information (e.g., subscription data).

The user equipment 102 can include more than one communication client including a native communication client ("native client") and one or more non-native communication clients ("non-native client"). The user equipment 102 may, by default, automatically designate the native client as the primary communication client ("primary client") during the initial setup to use the user equipment 102. A primary client is the communication client designated to receive incoming communications for the user equipment 102. All other non-primary communication clients installed on the user equipment 102 may be referred to as "secondary clients" for the user equipment 102.

Examples of the user equipment 102 can include but is not limited to, smartphones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the user equipment 102 include, but are not limited to, smart devices such as televisions, refrigerators, washing machines, dryers, smart mirrors, coffee machines, lights, lamps, temperature sensors, music players, headphones, or any other electronic appliances that can generate, request, receive, transmit, or exchange voice, video, and/or digital data over a network.

The client agent component 104 may set a primary client for a user equipment 102, as described herein. Initially, on first use of the user equipment 102, the client agent component 104 may automatically set the native client of the user equipment 102 as the primary client. The client agent component 104 may identify a list of non-native communication clients installed on the user equipment 102. In various examples, the client agent component 104 may associate a Universally Unique Identifier (UUID) with each of the non-native communication clients. In some examples, the client agent component 104 may generate a user interface to present the list of communication clients installed on the user equipment 102. The user equipment 102 may receive user input designating a selected communication client as the primary client from the user interface. In additional and/or alternate examples, in response to opening a new communication client, the client agent component 104 or the new communication client may generate a user interface to ask whether the user wishes to designate the current communication client as the primary client.

The client agent component 104 may publish changes in the designation of the primary client to the network device (s) 108. Initially, the client agent component 104 may publish the designation of the native client as the primary client to the network device(s) 108. The client agent component 104 may include the International Mobile Equipment Identity (IMEI) of the user equipment 102 in Session Initiation Protocol (SIP) information to publish the designation of the native client as the primary client. In response to receiving user input indicating the designation of a non-native client as the primary client, the client agent component 104 may publish the designation of the non-native client as the primary client to the network device(s) 108. Alternatively, and/or additionally, the network device (s) 108 may interrogate the client agent component 104 for the designation of a primary client. For instance, the network device(s) 108 may attempt to establish a communication session with a user equipment 102, if the network device(s) 108 does not have any information for the user equipment 102, the network device(s) 108 may interrogate the client agent component 104 and/or another communications receiving client on the user equipment 102. The client agent component 104 may include a primary designator that includes, within or as part of, the Universally Unique Identifier (UUID) of the non-native client in Session Initiation Protocol (SIP) information to publish the designation of the non-native client as the primary client. The primary designator may be any predetermined indicator including any combination of strings, characters, numbers, or symbols.

The client agent component 104 may send a subscribe request to poll the capabilities of the primary client of a recipient account and/or device to the network device(s) 108, as described herein. In some examples, the client agent component 104 may store a list of subscriptions based at least in part on association with a contact list of the user equipment 102.

In some examples, the client agent component 104 can receive a notify response indicating the communications capabilities of the primary client of the recipient account and/or device from the network device(s) 108, as described herein. In response to sending the subscribe request to the network device(s) 108, the client agent component 104 may receive the capability set for the primary client of the requested recipient account and/or device. The client agent component 104 may apply the capability set when communicating with the recipient device. Based on the capability set, the client agent component 104 may change the types of communication and the scale the quality and resolution of media files used in the communication.

The one or more transceiver(s) 106 can receive the signal at the user equipment 102, and the client agent component 104 can determine various metrics associated with the signal. For example, the one or more metrics can include but are not limited to, one or more of a received signal strength indication (RSSI), a reference signal received power (RSRP), a reference signal received quality (RSRQ), and a signal-to-interference-plus-noise ratio (SINR). Further, the metrics can include a channel identifier (e.g., channel 1, 2, ..., N (where N is an integer)) and/or an indication of a frequency associated with a channel (e.g., 617-622 MHz, 622-627 MHz, 627-632 MHz, ..., 647-652 MHz, and the like). Of course, these frequencies are examples and other frequencies can be used depending on various implementations. In some examples, the client agent component 104 can determine various metrics associated with the signal that cannot support the current primary client and may determine to temporarily switch the primary client to the native client. For instance, if the user equipment 102 moved to a location with poor network signal strength or quality, the client agent component 104 may determine the signal is unable to support the primary client and may temporarily switch the primary client to the native client.

The network device(s) 108 can include a client manager component 110. In some instances, the network device(s) 108 can be implemented as one or more communication servers to facilitate communications by and between the various devices in the system 100. That is, the network device(s) 108 can represent any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies. Thus, the network device(s) 108 may implement GSM, UMTS, LTE/LTE Advanced, and/or NR telecommunications technologies. In some instances, the telecommunication technologies can be referred to generally as a radio access technology. Thus, a 5G network can represent 5G radio access technology. The network device(s) 108 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user equipment 102, the network device(s) 108, and/or the network(s) 112. In some embodiments, the network device(s) 108 are operated by a service provider.

While FIG. 1 illustrates the network device(s) 108, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

The client manager component 110 can receive and store user data including designated primary client information from user equipment 102, as discussed herein. The client manager component 110 can maintain a user database with user accounts associated with the user equipment 102. Initially, the client manager component 110 can receive a first publish request from a user equipment 102 and can associate the user account with the International Mobile Equipment Identity (IMEI) identifier for the native client. In some examples, the client manager component 110 can receive a second publish from the user equipment 102 and may parse the SIP instance to determine if there is a primary designator.

If there is a primary designator, the client manager component 110 may store the Universally Unique Identifier (UUID) as the primary client for the user account. The client manager component 110 may associate a user account with a Mobile Station International Subscriber Directory Number (MSISDN), International Mobile Subscriber Identity (IMSI), and further associated the user account with a native client by IMEI identifier and a primary client by UUID. The client manager component 110 maintains the communications logic for the user equipment 102 to identify the primary client to first contact to establish a connection with. In some examples, the client manager component 110 may also maintain the capability set associated with the primary client.

The client manager component 110 can receive a subscribe request for a recipient from a user equipment 102, as discussed herein. The client manager component 110 can receive the subscribe request for a recipient may look up the primary client associated with the recipient. If there is an entry for the primary client, the client manager component 110 may send a notify back to the user equipment 102 with the capability set associated with the primary client.

Examples of the network(s) 112 can include but are not limited to networks including second-generation (2G), third-generation (3G), fourth-generation (4G) cellular networks, such as LTE (Long Term Evolution), fifth-generation (5G) networks, and data networks, such as Wi-Fi networks.

In some instances, the user equipment 102 can communicate with any number of user equipment, servers, network devices, computing devices, and the like.

As a non-limiting example, the example system 100 can illustrate an instance of designating a primary client. For example, a first user of the user equipment 102(1) may install and run an example non-native client 114. In response to running the example non-native client 114 for the first time or based on the user selecting a set default client option, the example non-native client 114 may ask if the user wishes to set the client as the primary client for the user equipment 102(1).

In response to detecting a user input selecting example affirmative 116 to designate the example non-native client 114 as the primary client, the user equipment 102(1) may send the example publish 118 to the network device(s) 108. The example publish 118 may include a Session Initiation Protocol (SIP) instance including a primary designator and a Universally Unique Identifier (UUID) of the example non-native client 114.

In the present example, the network device(s) 108 can receive and store user data included in the example publish 118. The network device(s) 108 can parse the SIP instance to determine there is a primary designator and store the Universally Unique Identifier (UUID) of the example non-native client 114 as the primary client for the user account of the first user. The network device(s) 108 may also store the capability set associated with the example non-native client 114.

Additionally, in the present example, a second user of the user equipment 102(2) would like to send a message to the first user of the user equipment 102(1). The user equipment 102(2) may send an example subscribe request 120 to the network device(s) 108 to poll the communications capabilities of the primary client of the user equipment 102(1). The example subscribe request 120 may include an identifier associated with a user account of the first user and/or the user equipment 102(1). In response to the example subscribe request 120, the network device(s) 108 may transmit an example notify response 122 to the user equipment 102(2). In some examples, the example notify response 122 may include an acknowledgement of the subscribe request. In an alternative and/or additional example, the example notify response 122 may include the capability set for the primary client of the user equipment 102(1). The capability set may include the communication capabilities of the example non-native client 114.

The user equipment 102(2) may receive the capability set that indicates the communications capabilities of the primary client of the user equipment 102(1) includes video conferencing, multimedia messaging, and audio. The second user may wish to share a funny animated meme he saw that day, so the user equipment 102(2) may transmit the meme as the example multimedia message 124 to the user equipment 102(1). As can be understood, the example multimedia message 124 may be transmitted from the user equipment 102(2) to the user equipment 102(1) while passing through any number of network(s) 112 and/or network device(s) 108, but the transmission of the example multimedia message 124 is to illustrate user equipment 102(2) can communicate with the user equipment 102(1) using a type of communications provided by the example notify response 122.

Figure 2:
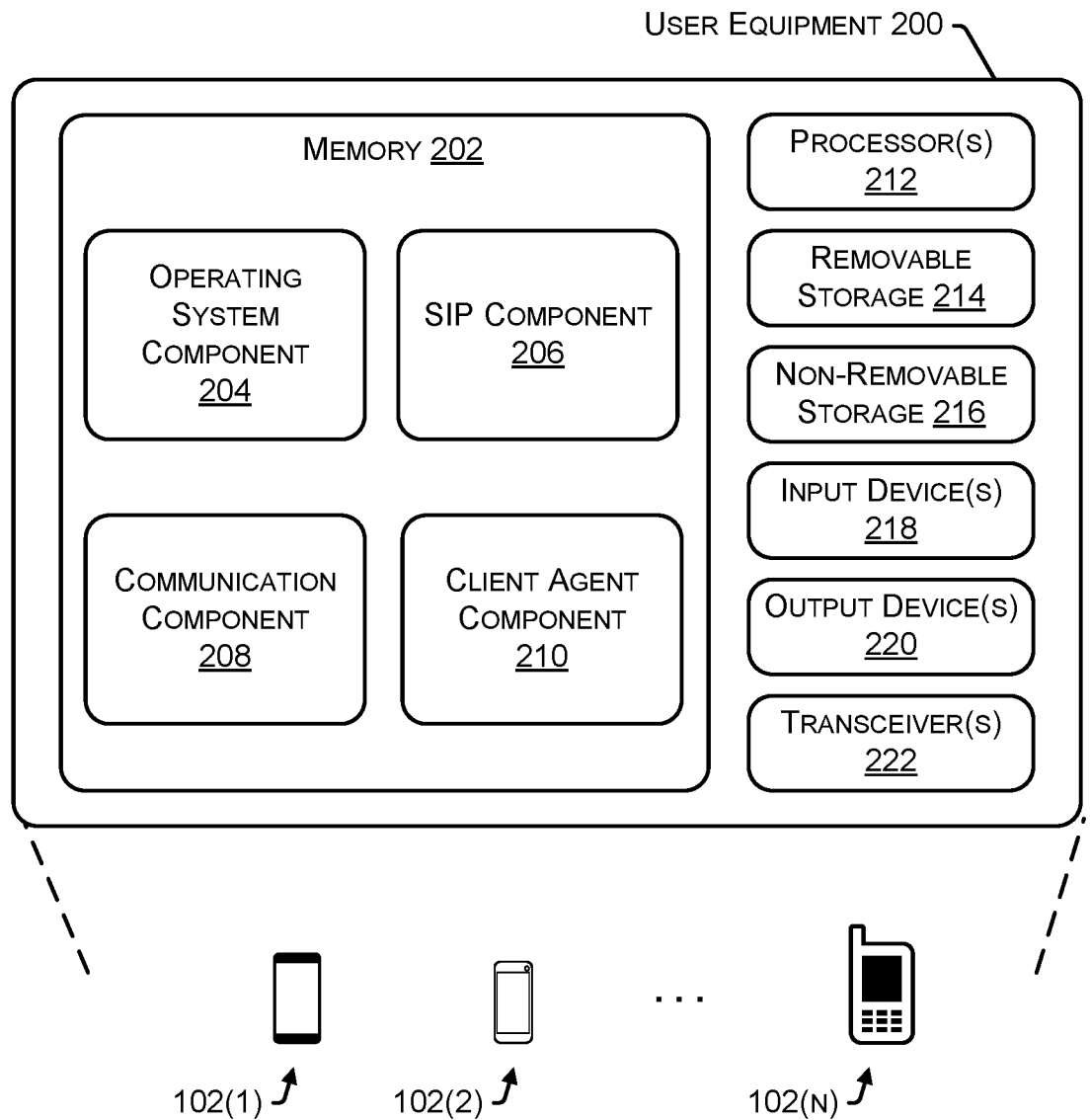
FIG. 2 illustrates an example user equipment configured to implement the client managing components, in accordance with embodiments of the disclosure.

FIG. 2 illustrates an example user equipment 200 configured to implement the client managing components, in accordance with embodiments of the disclosure. In some embodiments, the user equipment 200 can correspond to the user equipment 102 of FIG. 1. It is to be understood in the context of this disclosure that the user equipment 200 can be implemented as a single device or as a plurality of devices with components and data distributed among them. By way of example, and without limitation, the user equipment 200 can be implemented as various user equipment 102(1), 102(2), . . . , 102(N).

As illustrated, the user equipment 200 comprises a memory 202 storing an operating system component 204, a SIP component 206, a communication component 208, and a client agent component. Also, the user equipment 200 includes processor(s) 212, a removable storage 214 and non-removable storage 216, input device(s) 218, output device(s) 220, and transceiver(s) 222.

In various embodiments, the memory 202 is volatile (such as RAM), non-volatile (such as ROM, flash memory, etc.) or some combination of the two. The operating system component 204, the SIP component 206, the communication component 208, and the client agent component 210 stored in the memory 202 can comprise methods, threads, processes, applications, or any other sort of executable instructions. The operating system component 204, the SIP component 206, the communication component 208, and the client agent component 210 can also include files and databases.

The operating system component 204 can include functionality to identify and track the different applications installed on the user equipment 200. The operating system component 204 can include functionality to query a chipset of the user equipment 200, and/or query the transceiver(s) 222, to instruct the transceiver(s) 222 and/or any software or hardware to scan one or more channels or frequency resources to determine metrics associated with the channel or frequency resources, for example. In various examples, the operating system component 204 may generate Universally Unique Identifier (UUID)s and associate the UUIDs with any software or hardware components to uniquely identify each component within the device. For instance, the operating system component 204 may associate a new messaging app with a first UUID and a new social media app with a second UUID, and communications routing to these apps may reference their associated UUIDs. In some instances, the operating system component 204 can include an API to receive instructions from the client agent component 210 and to provide data to the client agent component 210, including identifying the communication clients installed on the device and the clients' corresponding communications capabilities, and notifying the client agent component 210 of new client installs and/or executions.

The SIP component 206 may enable communications to be served using Session Initiation Protocol (SIP). The SIP component 206 may transmit SIP messages containing information for identifying the user account, user equipment, and/or the communication client to serve a communication session including but not limited to: SIP instance information, access network information, Mobile Station International Subscriber Directory Number (MSISDN), International Mobile Subscriber Identity (IMSI), International Mobile Equipment Identity (IMEI) of the device, Universally Unique Identifier (UUID), called-party-address as Circuit-Switched Routing Number (CSRN), and session description protocol (SDP). The SIP component 206 may use SIP signaling and determine the current location of the user equipment 200 using a Global Positioning System (GPS).

In some examples, a phone mode may be determined based at least in part on a location (e.g., the current location) associated with a user equipment. For example, if the current location of the user equipment 200 is within a geographic area in which a service provider, associated with an identifier of the user equipment 200, provides coverage, then the phone mode may be set to carrier mode. If the current location of the user equipment 200 is in a geographic area in which the service provider does not provide coverage, then the phone mode may be set to Over-The-Top (OTT) mode. In some examples, the SIP component 206 may determine, based on the phone mode not set to carrier mode, that certain carrier-specific functions may be unavailable including, but not limited to, selecting certain types of communications or client designations.

In examples, the SIP component 206 may transmit SIP messages with headers and/or strings to trigger specific functions and/or commands. As described herein, the SIP information may include a primary designator and the Universally Unique Identifier (UUID) of a client to notify the network server to set the primary client. The primary designator may be any predetermined static string including any combination of characters, numbers, or symbols. For instance, the SIP information may include the example string "PRIMARY" or the example alpha-numeric code "P+999" or any static string that is a predetermined primary designator for the system. Additionally, the SIP information may include: PUBLISH, SUBSCRIBE, NOTIFY, and the like.

The communication component 208 can include functionality to conduct communications with one or more other devices, as discussed herein. The communication component 208 can include functionality to provide backend communication functions while the different communication clients provide the frontend interface. In some instances, the communication component 208 can take priority over resources of the user equipment 200 to conduct communication. For instance, if the user is currently playing a network-intensive online game application, the communication component 208 can pause the game application for incoming calls. In some examples, the communication component 208 may determine to override a primary client designation in favor of the native client. That is, if the primary client is not the native client, and if the communication component 208 determines the primary client is unable to conduct communications due to hardware or network resource issues, the communication component 208 can conduct communications with a native client. For instance, if the communication component 208 receives "Red Alert" notification from the network, and the primary client is not able to execute, the communication component 208 may receive the notification with the native texting client.

The communication component 208 may include functionality to send and receive communications (e.g., a voice call, an SMS, or an MMS) and/or determine when to transition an existing communication from one access network to another. In some examples, the communication component 208 may perform a number of functions, such as interfacing with the transceiver(s) 222, preparing the user equipment 200 to receive communications, tuning the transceiver(s) 222, receiving and processing an invitation message such as a SIP instance received via the transceiver(s) 222, and the like. In various examples, the communication component 208 may determine that a connection to an unlicensed data network is of insufficient quality to handle communication using the primary client for the selected type of communication via a voice call and/or a video call. In the present example, the communication component 208 may determine to temporarily transition an existing communication from a primary client to another client, usually a native client.

The client agent component 210 may designate a primary client for the user equipment 200, as described herein. Initially, the client agent component 210 may determine to designate a native client of the present device as the primary client. The client agent component 210 may send, to the network, a publish request to set the native client as the primary client. While the client agent component 210 may send the client information to the network, it is understood in the context of this document, that the user equipment 200 may send and/or receive the client information via the client agent component 210, the communication component 208, and/or another component. Additionally, and/or alternatively, the user equipment 200 may send the client information to the network in response to an interrogation rather than as a publish request.

The client agent component 210 may publish changes in the designation of the primary client to the network. In various examples, the client agent component 210 may configure a user interface to receive user input to change the designation of the primary client. In some examples, the client agent component 210 may query the operating system component 204 to identify a list of communication clients installed on the user equipment 200. The client agent component 210 may configure the user interface to present the list of communication clients. In additional and/or alternate examples, in response to executing or installing a new client, the client agent component 210 or the new client may configure a user interface to ask whether the user wishes to designate the new client as the primary client. The client agent component 210 may receive user input indicating the designation of the new client as the primary client. In response, the client agent component 210 may notify the network to designate the new client as the primary client.

For example, upon initiating the user equipment 200 to a network, the client agent component 210 may send, to the network, a first publish request to designate the native client as the primary client. The first publish request may include a SIP message indicating: (1) the request (e.g., "PUBLISH"); (2) the present device identifier (e.g., MSISDN); and (3) the native client identifier (e.g., IMEI). Upon receiving user input indicating the designation of the new client as the primary client, the user equipment 200 may send, via the new client and/or the client agent component 210, to the network, a second publish request to designate the new client as the primary client. The second publish request may include a SIP message indicating: (1) the request (e.g., "PUBLISH"); (2) the present device identifier (e.g., MSISDN); (3) the primary designator (e.g., "PRIMARY"); and (4) the new client identifier (e.g., UUID).

The client agent component 210 may send a subscribe request to poll the communications capabilities of a recipient account to the network. In response to the subscribe, the client agent component 210 may receive a notify response including a capability set for the recipient account from the network. In some examples, the client agent component 210 may store the notify response data as subscription data. The client agent component 210 may purge the subscription data based on age (e.g., remove any notify response data after 3 months).

The client agent component 210 may apply the capability set when communicating with the recipient account. Based on the capability set, the client agent component 210 may change the types of communication and/or scale the quality and resolution of multimedia files used in the communication.

In some instances, the client agent component 210 can correspond to the client agent component 104 of FIG. 1.

In some embodiments, the processor(s) 212 is a central processing unit (CPU), a graphics processing unit (GPU), or both CPU and GPU, or other processing unit or component known in the art.

The user equipment 200 also includes additional data storage devices (removable and/or non-removable) such as, for example, magnetic disks, optical disks, or tape. Such additional storage is illustrated in FIG. 2 by removable storage 214 and non-removable storage 216. Tangible computer-readable media can include volatile and non-volatile, removable and non-removable media implemented in any method or technology for storage of information, such as computer readable instructions, data structures, program modules, or other data. Memory 202, removable storage 214 and non-removable storage 216 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user equipment 200. Any such tangible computer-readable media can be part of the user equipment 200.

In various embodiments, the user equipment 200 can include applications including but are not limited, a web browser application, a video streaming application, an online gaming application, a network analyzer, and the like. During execution on the user equipment 102, each of the applications may be configured to cause the user equipment 102 to initiate data communications with the network device(s) 108 over the network(s) 112.

The user equipment 102 may be configured to communicate over a telecommunications network using any common wireless and/or wired network access technology. Moreover, the user equipment 102 may be configured to run any compatible device operating system (OS), including but not limited to, Microsoft Windows Mobile, Google Android, Apple iOS, Linux Mobile, as well as any other common mobile device OS.

The user equipment 200 also can include input device(s) 218, such as a keypad, a cursor control, a touch-sensitive display, voice input device, etc., and output device(s) 220 such as a display, speakers, printers, etc. These devices are well known in the art and need not be discussed at length here.

As illustrated in FIG. 2, the user equipment 200 also includes one or more wired or wireless transceiver(s) 222. For example, the transceiver(s) 222 can include a network interface card (NIC), a network adapter, a LAN adapter, or a physical, virtual, or logical address to connect to various network(s) 112, or to the network device(s) 108, for example. To increase throughput when exchanging wireless data, the transceiver(s) 222 can utilize multiple-input/multiple-output (MIMO) technology. The transceiver(s) 222 can comprise any sort of wireless transceivers capable of engaging in wireless, radio frequency (RF) communication. The transceiver(s) 222 can also include other wireless modems, such as a modem for engaging in Wi-Fi, WiMax, Bluetooth, infrared communication, and the like.

In some instances, the transceiver(s) 222 can correspond to the transceiver(s) 106 of FIG. 1.

Figure 3:
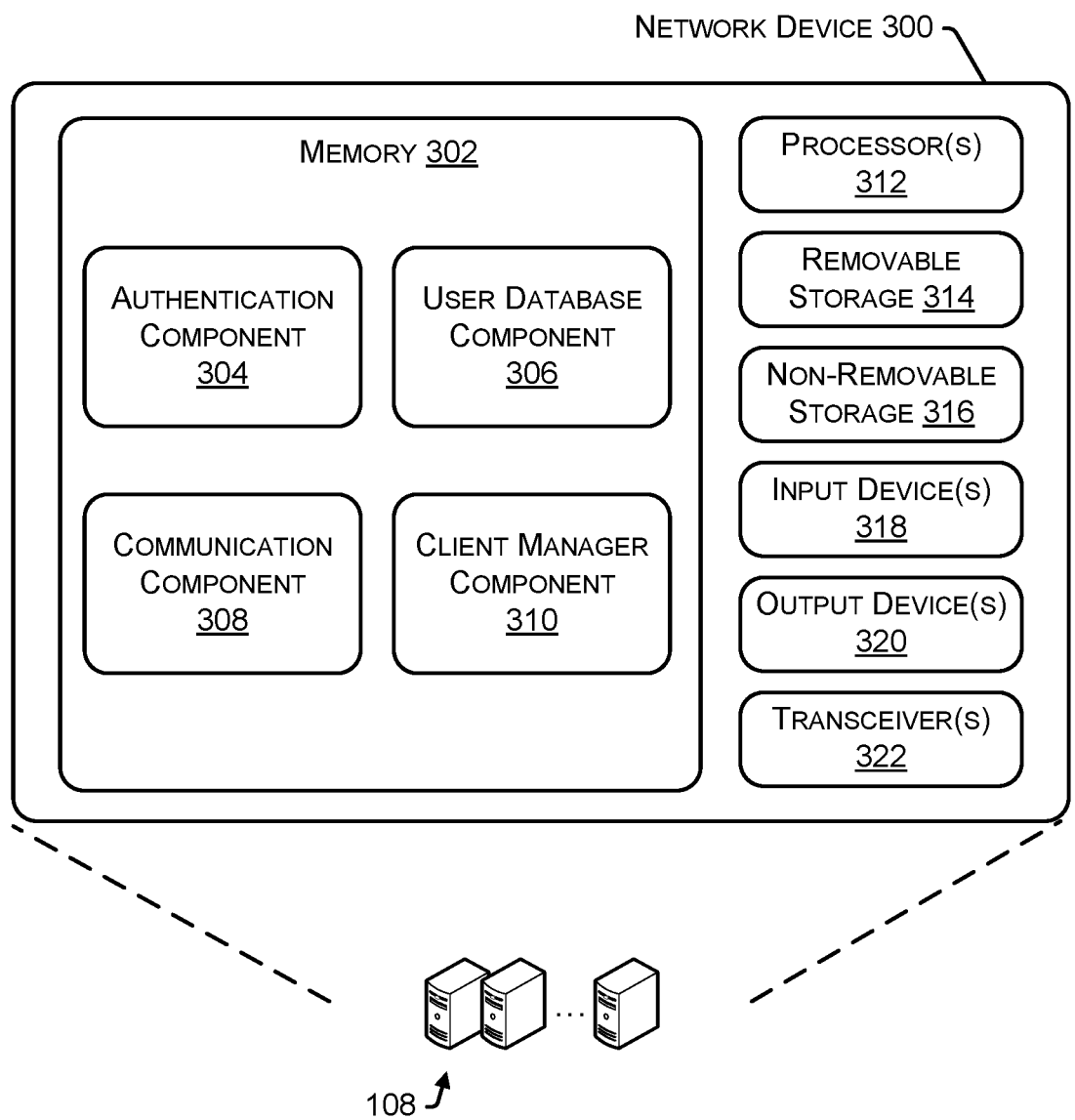
FIG. 3 illustrates an example network device configured to implement the client managing components, in accordance with embodiments of the disclosure.

FIG. 3 illustrates an example network device 300 configured to implement the client managing components, in accordance with embodiments of the disclosure. In some embodiments, the network device 300 can correspond to the network device(s) 108 of FIG. 1. It is to be understood in the context of this disclosure that the network device 300 can be implemented as a single device or as a plurality of devices with components and data distributed among them.

As illustrated, the network device 300 comprises a memory 302 storing an authentication component 304, a user database component 306, a communication component 308, and a client manager component 310. Also, the network device 300 includes processor(s) 312, a removable storage 314 and non-removable storage 316, input device(s) 318, output device(s) 320, and transceiver(s) 322.

In various embodiments, the memory 302 is volatile (such as RAM), non-volatile (such as ROM, flash memory, etc.) or some combination of the two. The authentication component 304, the user database component 306, the communication component 308, and the client manager component 310 stored in the memory 302 can comprise methods, threads, processes, applications, or any other sort of executable instructions. The authentication component 304, the user database component 306, the communication component 308, and the client manager component 310 can also include files and databases.

The authentication component 304 can include functionality to authenticate user accounts, devices, and/or any other communications components to interact with the network. In some examples, the authentication component 304 may present a user portal for a user to create a user account and register a user device with the network. The authentication component 304 may receive requests to initiate the user device. The authentication component 304 may verify that the user device is permitted to join the network and prompt the user for account information. The authentication component 304 may retrieve data from the user database component 306 and/or any other database to verify a user account and/or user device is authorized to use the services provided by the network device 300. In some examples, the authentication component 304 may determine a user device is authorized to override its native client.

In some examples, the authentication component 304 may determine whether a potential subscriber's account is authorized to subscribe to an account associated with a recipient. For instance, the recipient's account data may include a "block list" from the native client, the authentication component 304 may verify the potential subscriber is authorized to contact the recipient before transmitting recipient. Additionally, and/or alternatively, the authentication component 304 may verify the identity of the potential subscriber.

The user database component 306 can collect information associated with user accounts in a database. The user database component 306 can collect information for a user associated with a user account, the information including username, account identifier, user equipment, subscription, and the like. The user database component 306 can also collect information specific to the user equipment, including a device type, a device identifier, a primary client identifier, a native client identifier, client type, communications capabilities, and the like. As described herein, the authentication component 304 may present a user portal for a user to create a user account, register a user device with the network, and may receive a request to initiate a user device. The user database component 306 may receive information from the user device including one or more of: Mobile Station International Subscriber Directory Number (MSISDN), an International Mobile Subscriber Identity (IMSI), International Mobile Equipment Identity (IMEI), and the like. In some examples, the user database component 306 may associate the user account with the MSISDN of the user equipment.

The communication component 308 can include functionality to determine a communication logic to use when communicating with a recipient device. For example, the communication component 308 can determine the recipient account has designated a primary client that is not the same as the native client. The communication component 308 may apply the communication logic to direct communications to the primary client for the recipient device. In some examples, the communication component 308 may ping the primary client of the recipient device before transmitting communication data. If the primary client does not respond to the ping, the communication component 308 may repeat the attempt to ping the primary client up to a threshold number of attempts, and after making the threshold number of attempts to ping the primary client, the communication component 308 may determine to direct communications to the native client. For instance, the network may have a multimedia message to be routed to a primary client, the communication component 308 may ping the primary client three times and may determine to route the multimedia message to the native client.

The client manager component 310 can receive and store user data including communication client information from a user equipment, as described herein with respect to the client manager component 110 of FIG. 1. The client manager component 310 may maintain user data and information stored in the user database component 306.

In some examples, the client manager component 310 can receive publish request from a communication client of a user equipment. The publish request may include SIP information to set native client as the primary by default, or designate a new client as the primary by the indicator. The SIP information may include information related to the user equipment and/or the client, the information may include one or more of: Mobile Station International Subscriber Directory Number (MSISDN), an International Mobile Subscriber Identity (IMSI), International Mobile Equipment Identity (IMEI), Universally Unique Identifier (UUID), a primary designator, and the like. The client manager component 310 can determine the publish request is for setting a primary client for the user account and/or user equipment associated with a Mobile Station International Subscriber Directory Number (MSISDN). If the SIP information includes the IMEI, the client manager component 310 can determine the user equipment is setting the native client as the primary client. The client manager component 310 can associate both the native client and primary client with the IMEI. If the SIP information includes a primary designator and a UUID, the client manager component 310 can determine the user equipment is setting a non-native client as the primary client. The client manager component 310 can associate the primary client by the UUID. The client manager component 310 can set the communication logic to route communications to the correct primary client based on the publish request. The client manager component 310 can query the user device for the communications capabilities of the currently transmitting communication client and may store the communications capabilities as the capability set of the client.

For example, the client manager component 310 can receive a first publish request from a user account. The first publish request may include a SIP message indicating: (1) the request (e.g., "PUBLISH"); (2) the present device identifier (e.g., MSISDN); and (3) the native client identifier (e.g., IMEI). The client manager component 310 can associate the user account with the MSISDN. In response to receiving the IMEI, the client manager component 310 can associate the native client with the IMEI. In some examples, the client manager component 310 can associate the primary client with the native client and/or the IMEI also. The client manager component 310 can determine a capability set of the primary client that corresponds to the first communications capabilities of the first communication client.

The client manager component 310 can receive a second publish request from the user and can determine the SIP instance includes a primary designator. In response to the primary designator, the client manager component 310 may store the Universally Unique Identifier (UUID) as the primary client identifier for the user account. The client manager component 310 may associate a user account with a Mobile Station International Subscriber Directory Number (MSISDN), an International Mobile Subscriber Identity (IMSI), and further associated the user account with a native client by IMEI identifier and a primary client by UUID. The client manager component 310 maintains the communications logic for the user equipment to identify the primary client to contact first to establish a connection with. In some examples, the client manager component 310 may also maintain the capability set associated with the primary client. In various examples, the client manager component 310 may purge and/or reconfirm some user data including client-related information based on the age of data (e.g., remove client information after six months from the last publish request).

The client manager component 310 can receive a subscribe request for a recipient from a user equipment, as discussed herein. The subscribe request may include information to identify the recipient including one or more of: user account identifier, user account handle, Mobile Station International Subscriber Directory Number (MSISDN), an International Mobile Subscriber Identity (IMSI), and the like. The client manager component 310 may receive a subscribe request for a recipient and may look up the primary client associated with the recipient. If there is an entry for the primary client, the client manager component 310 may send a notify response to the user equipment with the capability set associated with the primary client. In some examples, if the client manager component 310 receives a new designation of primary client for the recipient, the client manager component 310 may send updated notify responses to subscribers for the recipient.

In some instances, the client manager component 310 can correspond to the client manager component 110 of FIG. 1.

In some embodiments, the processor(s) 312 is a central processing unit (CPU), a graphics processing unit (GPU), or both CPU and GPU, or other processing unit or component known in the art.

The network device 300 also includes additional data storage devices (removable and/or non-removable) such as, for example, magnetic disks, optical disks, or tape. Such additional storage is illustrated in FIG. 3 by removable storage 314 and non-removable storage 316. Tangible computer-readable media can include volatile and nonvolatile, removable and non-removable media implemented in any method or technology for storage of information, such as computer readable instructions, data structures, program modules, or other data. Memory 302, removable storage 314 and non-removable storage 316 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information, and which can be accessed by the network device 300. Any such tangible computer-readable media can be part of the network device 300.

The network device 300 can include input device(s) 318, such as a keypad, a cursor control, a touch-sensitive display, etc. Also, the network device 300 can include output device(s) 320, such as a display, speakers, etc. These devices are well known in the art and need not be discussed at length here.

As illustrated in FIG. 3, the network device 300 can include one or more wired or wireless transceiver(s) 322. In some wireless embodiments, to increase throughput, the transceiver(s) 322 can utilize multiple-input/multiple-output (MIMO) technology. The transceiver(s) 322 can be any sort of wireless transceivers capable of engaging in wireless, radio frequency (RF) communication. The transceiver(s) 322 can also include other wireless modems, such as a modem for engaging in Wi-Fi, WiMax, Bluetooth, infrared communication, or the like.

Figure 4:
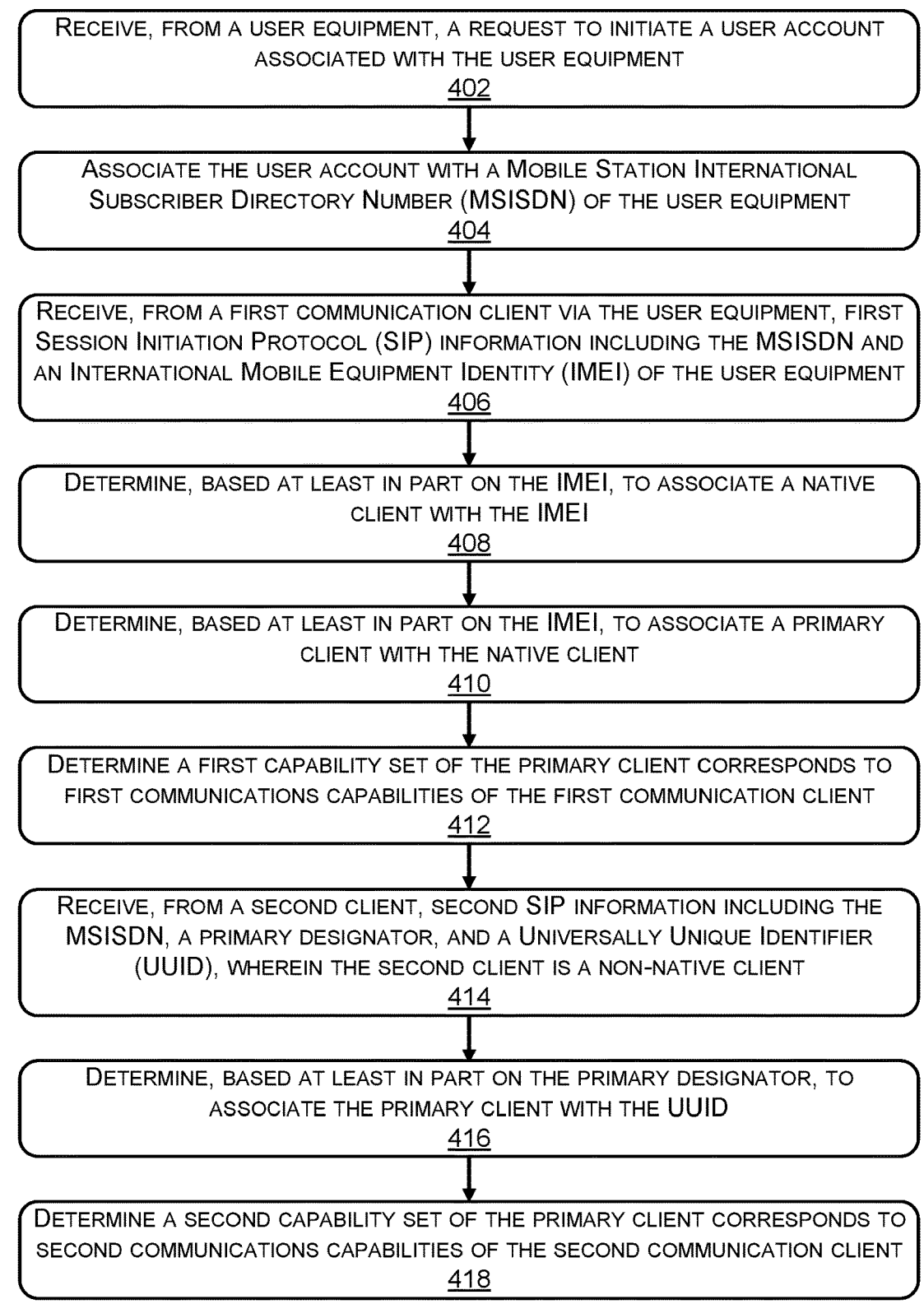
FIG. 4 illustrates an example process for determining a primary client for a user equipment, as discussed herein.

FIGS. 4 and 5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 4 illustrates an example process 400 for determining a primary client for a user equipment, as discussed herein. The example process 400 can be performed by the network device(s) 108 and 300 (or another component), in connection with the user equipment 102 and 200 (or another component), and other components discussed herein. Some or all of the process 400 can be performed by one or more devices, equipment, or components illustrated in FIGS. 1-3, for example.

At operation 402, the process can include receiving, from a user equipment, a request to initiate a user account associated with the user equipment. As discussed herein, the system may present a user portal for a user to create a user account and register a user equipment with the network. The system may receive, from the equipment, requests to initiate the user equipment to use with the network.

At operation 404, the process can include associating the user account with a Mobile Station International Subscriber Directory Number (MSISDN) of the user equipment. As discussed herein, the system may present a user portal for a user to create a user account, register a user device with the network, and may receive a request to initiate a user device. The system may receive information from the user device including one or more of: Mobile Station International Subscriber Directory Number (MSISDN), an International Mobile Subscriber Identity (IMSI), International Mobile Equipment Identity (IMEI), and the like. In some examples, the system may associate the user account with the MSISDN of the user equipment.

At operation 406, the process can include receiving, from a first communication client via the user equipment, first Session Initiation Protocol (SIP) information including the MSISDN and an International Mobile Equipment Identity (IMEI) of the user equipment. As discussed herein, the system can receive a first publish request from a user equipment. The publish request may include SIP information to set native client as the primary by default, or designate a new client as the primary by indicator. If the SIP information includes the International Mobile Equipment Identity (IMEI), the system can determine the user equipment is setting the native client as the primary client.

At operation 408, the process can include determining, based at least in part on the IMEI, to associate a native client with the IMEI. As discussed here, the system can receive a publish request from a user account. The publish request may include SIP information to set native client as the primary by default, or designate a new client as the primary by indicator. If the SIP information includes the International Mobile Equipment Identity (IMEI), the system can determine the user equipment is setting the native client as the primary client.

At operation 410, the process can include determining, based at least in part on the IMEI, to associate a primary client with the native client. As discussed herein, the system can receive publish request from a communication client of a user equipment. The publish request may include SIP information to set native client as the primary by default, or designate a new client as the primary by indicator. If the SIP information includes the International Mobile Equipment Identity (IMEI), the system can determine the user equipment is setting the native client as the primary client. The system can associate both the native client and the primary client with the IMEI. That is, the system can associate the primary client with a native client.

At operation 412, the process can include determining a first capability set of the primary client corresponds to first communications capabilities of the first communication client. As discussed herein, the system can set the communication logic to route communications to the correct primary client based on the publish request. The system can query the user device for the communications capabilities of the currently transmitting communication client and may store the communications capabilities as the capability set of the client. For example, the system can receive a first publish request from a user account. The first publish request may include a SIP message indicating: (1) the request (e.g., "PUBLISH"); (2) the present device identifier (e.g., MSISDN); and (3) the native client identifier (e.g., IMEI). The system can associate the user account with the MSISDN. In response to receiving the IMEI, the system can associate the native client with the IMEI. In some examples, the system can associate the primary client with the native client and/or the IMEI also. The system can determine a capability set of the primary client that corresponds to first communications capabilities of the first communication client.

At operation 414, the process can include receiving, from a second communication client via the user equipment, second SIP information including the MSISDN, a primary designator, and a Universally Unique Identifier (UUID). As discussed herein, the system can receive publish request from a communication client of a user equipment. The publish request may include SIP information to designate a new client as the primary by indicator. If the SIP information includes a primary designator and a UUID, the system can determine the user equipment is setting a non-native client as the primary client. The system can associate the primary client by the UUID. The system can set the communication logic to route communications to the correct primary client based on the publish request. The system can query the user device for the communications capabilities of the currently transmitting communication client and may store the communications capabilities as the capability set of the client.

At operation 416, the process can include determining, based at least in part on the primary designator, to associate the primary client with the UUID. As discussed herein, the system can receive publish request from a communication client of a user equipment. If the SIP information includes a primary designator and a UUID, the system can determine the user equipment is setting a non-native client as the primary client.

At operation 418, the process can include determining a second capability set of the primary client that corresponds to second communications capabilities of the second communication client. As discussed herein, the system can receive publish request from a communication client of a user equipment. The system can query the user device for the communications capabilities of the currently transmitting communication client and may store the communications capabilities as the capability set of the client.

FIG. 5 illustrates an example process 500 for receiving client information from a first user equipment and notifying a second user equipment of the client information, as discussed herein. The example process 500 can be performed by the network device(s) 108 and 300 (or another component), in connection with the user equipment 102 and 200 (or another component), and other components discussed herein. Some or all of the process 500 can be performed by one or more devices, equipment, or components illustrated in FIGS. 1-3, for example.

At operation 502, the process can include receiving, from a user equipment, first Session Initiation Protocol (SIP) information including a Mobile Station International Subscriber Directory Number (MSISDN) and an International Mobile Equipment Identity (IMEI) of the user equipment. As discussed herein, the system can receive publish request from a communication client of a user equipment. The publish request may include SIP information to set native client as the primary by default, or designate a new client as the primary by indicator. The SIP information may include information related to the user equipment and/or the client, the information may include one or more of: Mobile Station International Subscriber Directory Number (MSISDN), an International Mobile Subscriber Identity (IMSI), International Mobile Equipment Identity (IMEI), Universally Unique Identifier (UUID), a primary designator, and the like. The system can determine the publish request is for setting a primary client for user account and/or user equipment associated with a Mobile Station International Subscriber Directory Number (MSISDN). If the SIP information includes the IMEI, the system can determine the user equipment is setting the native client as the primary client. The system can associate both the native client and primary client with the IMEI. If the SIP information includes a primary designator and a UUID, the system can determine the user equipment is setting a non-native client as the primary client. The system can associate the primary client by the UUID. The system can set the communication logic to route communications to the correct primary client based on the publish request. The system can query the user device for the communications capabilities of the currently transmitting communication client and may store the communications capabilities as the capability set of the client.

At operation 504, the process can include determining, based at least in part on the IMEI, a native client of the user equipment is associated with the IMEI. As discussed herein with respect to operation 502, if the SIP information includes the IMEI, the system can determine the user equipment is setting the native client as the primary client. The system can associate both the native client and the primary client with the IMEI.

At operation 506, the process can include receiving, from the user equipment, second SIP information including the MSISDN, a primary designator, and a Universally Unique Identifier (UUID). As discussed herein, the system can receive publish request from a communication client of a user equipment. The publish request may include SIP information to set native client as the primary by default, or designate a new client as the primary by indicator. The SIP information may include information related to the user equipment and/or the client, the information may include one or more of: Mobile Station International Subscriber Directory Number (MSISDN), an International Mobile Subscriber Identity (IMSI), International Mobile Equipment Identity (IMEI), Universally Unique Identifier (UUID), a primary designator, and the like.

At operation 508, the process can include determining, based at least in part on the primary designator, a primary client of the user equipment is associated with the UUID. As discussed herein, the system can receive publish request from a communication client of a user equipment. The publish request may include SIP information to set native client as the primary by default, or designate a new client as the primary by indicator. If the SIP information includes a primary designator and a UUID, the system can determine the user equipment is setting a non-native client as the primary client. The system can associate the primary client by the UUID.

At operation 510, the process can include determining a user account associated with the MSISDN includes the native client associated with the IMEI and the primary client associated with the UUID. As discussed herein, the system can determine the publish request is for setting a primary client for the user account and/or user equipment associated with a Mobile Station International Subscriber Directory Number (MSISDN). If the SIP information includes the IMEI, the system can determine the user equipment is setting the native client as the primary client. The system can associate the native client with the IMEI. If the SIP information includes a primary designator and a UUID, the system can determine the user equipment is setting a non-native client as the primary client. The system can associate the primary client by the UUID.

At operation 512, the process can include receiving, from a second user equipment, a subscribe request for the user account associated with the MSISDN. As discussed herein, the system can receive a subscribe request for a recipient from a user equipment. The subscribe request may include information to identify the recipient including one or more of: user account identifier, user account handle, Mobile Station International Subscriber Directory Number (MSISDN), an International Mobile Subscriber Identity (IMSI), and the like. The system may receive a subscribe request for a recipient and may look up the primary client associated with the recipient. If there is an entry for the primary client, the system may send a notify response to the user equipment with the capability set associated with the primary client. In some examples, if the system receives a new designation of primary client for the recipient, the system may send updated notify responses to subscribers for the recipient.

At operation 514, the process can include transmitting, to the second user equipment and based at least in part on the subscribe request, a notification with a capability set associated with communications capabilities of the primary client. As discussed herein with respect to the operation 512, the system may send a notify response to the user equipment with the capability set associated with the primary client.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors; and
programming instructions configured to be executed by the one or more processors to perform operations comprising:
receiving, from a user equipment, a request to initiate a user account associated with the user equipment;
associating the user account with a Mobile Station International Subscriber Directory Number (MSISDN) of the user equipment;
receiving, from a first communication client via the user equipment, first Session Initiation Protocol (SIP) information including the MSISDN and an International Mobile Equipment Identity (IMEI) of the user equipment;
determining, based at least in part on the IMEI, to associate a native client with the IMEI;
determining, based at least in part on the IMEI, to associate a primary client with the native client;
determining that a first capability set of the primary client corresponds to first communications capabilities of the first communication client;
receiving, from a second communication client via the user equipment, second SIP information including the MSISDN, a primary designator, and a Universally Unique Identifier (UUID);
determining, based at least in part on the primary designator, to associate the primary client with the UUID; and
determining that a second capability set of the primary client corresponds to second communications capabilities of the second communication client.

2. The system of claim 1, wherein the primary designator is an indicator including one or more of a string, a character, a number, or a symbol.

3. The system of claim 1, wherein the operations further comprise:
receiving, from a second user equipment, a subscribe request for the user account associated with the MSISDN; and
transmitting, to the second user equipment and based at least in part on the subscribe request, a notify response including the second capability set.

4. The system of claim 3, wherein the operations further comprise:
receiving, from the second user equipment, communication data for the user account associated with the MSISDN, the communication data including a multimedia message formatted according to the second capability set; and
transmitting, to the primary client with the UUID via the user equipment, the communication data.

5. The system of claim 3, wherein the operations further comprise:
receiving, from a third communication client via the user equipment, third SIP information including the MSISDN, the primary designator, and a second UUID;
determining, based at least in part on the primary designator, to associate the primary client with the second UUID;
determining that a third capability set of the primary client corresponds to third communications capabilities of the third communication client; and
transmitting, to the second user equipment and based at least in part on the subscribe request, a second notify response including the third capability set.

6. The system of claim 5, wherein the operations further comprise:
receiving, from the second user equipment, communication data for the user account associated with the MSISDN, the communication data including a multimedia message formatted according to the third capability set; and
transmitting, to the primary client using the second UUID via the user equipment, the communication data.

7. A method comprising:
receiving, from a first communication client via a user equipment, first Session Initiation Protocol (SIP) information including a Mobile Station International Subscriber Directory Number (MSISDN) and an International Mobile Equipment Identity (IMEI) of the user equipment;
determining, based at least in part on the IMEI, to associate a primary client with the IMEI;
determining that a first capability set of the primary client corresponds to first communications capabilities of the first communication client;
receiving, from a second communication client via the user equipment, second SIP information including the MSISDN, a primary designator, and a Universally Unique Identifier (UUID);
determining, based at least in part on the primary designator, to associate the primary client with the UUID; and
determining that a second capability set of the primary client corresponds to second communications capabilities of the second communication client.

8. The method of claim 7, wherein the first communication client is a native client of the user equipment and the second communication client is a non-native client that is designated as the primary client based at least in part on user input from the user equipment.

9. The method of claim 8, wherein the second communications capabilities of the second communication client includes at least one different communications capabilities with respect to the first communications capabilities of the first communication client.

10. The method of claim 7, further comprising:
receiving, from a second user equipment, a subscribe request for the MSISDN; and
transmitting, to the second user equipment and based at least in part on the subscribe request, a notify response including the second capability set.

11. The method of claim 10, further comprising:
receiving, from the second user equipment, communication data for the MSISDN, the communication data including a multimedia message formatted according to the second capability set; and transmitting, to the primary client using the UUID via the user equipment, the communication data.

12. The method of claim 10, further comprising:
receiving, from a third communication client via the user equipment, third SIP information including the MSISDN, the primary designator, and a second UUID;
determining, based at least in part on the primary designator, to associate the primary client with the second UUID;
determining that a third capability set of the primary client corresponds to third communications capabilities of the third communication client; and
transmitting, to the user equipment and based at least in part on the subscribe request, a second notify response including the third capability set.

13. The method of claim 12, further comprising:
receiving, from the second user equipment, communication data for the MSISDN, the communication data including a multimedia message formatted in accordance to the third capability set; and
transmitting, to the primary client using the second UUID via the user equipment, the communication data.

14. A method comprising:
receiving, from a user equipment, first Session Initiation Protocol (SIP) information including a Mobile Station International Subscriber Directory Number (MSISDN) and an International Mobile Equipment Identity (IMEI) of the user equipment;
determining, based at least in part on the IMEI, a native client of the user equipment is associated with the IMEI;
receiving, from the user equipment, second SIP information including the MSISDN, a primary designator, and a Universally Unique Identifier (UUID);
determining, based at least in part on the primary designator, a primary client of the user equipment is associated with the UUID; and
determining that a user account associated with the MSISDN includes the native client associated with the IMEI and the primary client associated with the UUID.

15. The method of claim 14, further comprising:
receiving, from the user equipment, third SIP information including the MSISDN, the primary designator, and a second UUID;
determining, based at least in part on the primary designator, the primary client of the user equipment is associated with the second UUID; and
determining that the user account associated with the MSISDN includes the native client associated with the IMEI and the primary client associated with the second UUID.

16. The method of claim 14, further comprising:
receiving, from a second user equipment, a subscribe request for the user account associated with the MSISDN; and
transmitting, to the second user equipment and based at least in part on the subscribe request, a notification with a capability set associated with communications capabilities of the primary client.

17. The method of claim 16, further comprising:
receiving, from the second user equipment, a request to initiate a communication session with a third SIP information, the third SIP information including the MSISDN and a multimedia message formatted according to the capability set; and
transmitting, to the user equipment, the request to initiate the communication session with a fourth SIP information including the UUID associated with the primary client.

18. The method of claim 17, further comprising:
determining the communication session could be established using the UUID associated with the primary client; and
establishing a connection with the user equipment using the primary client.

19. The method of claim 17, further comprising:
determining that the communication session could not be established using the UUID associated with the primary client;
transmitting, to the second user equipment, a second notification with a second capability set associated with communications capabilities of the native client; and
transmitting, to the user equipment, the request to initiate the communication session with a fifth SIP information including the IMEI associated with the native client.

20. The method of claim 19, further comprising:
determining that the communication session can be established using the IMEI associated with the native client; and
establishing a connection with the user equipment using the native client.

\* \* \* \* \*